Dec. 8, 1931. R. T. OSMAN 1,834,965
FRAME MOUNTING
Filed June 6, 1928 2 Sheets-Sheet 2
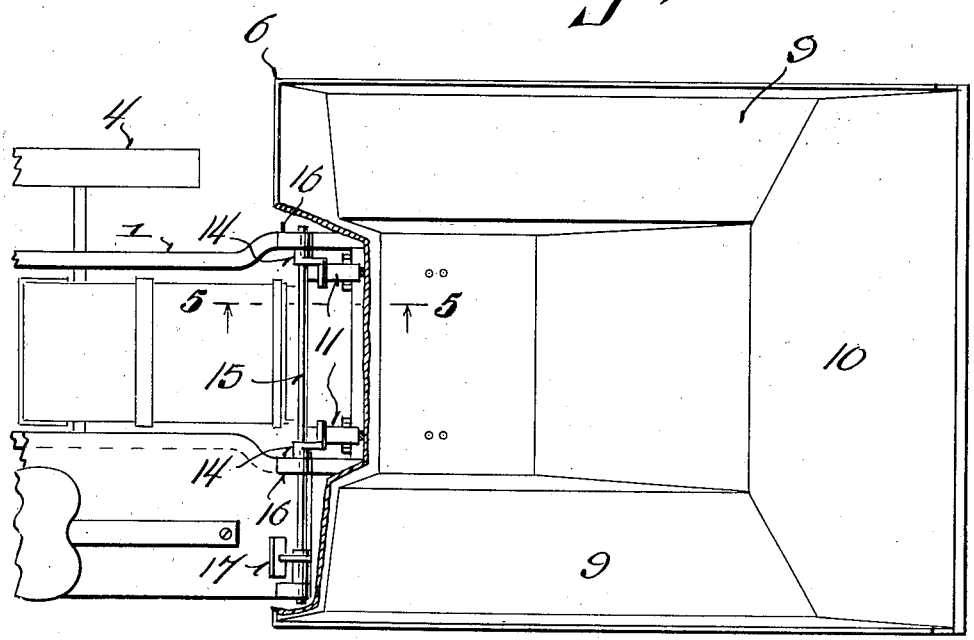
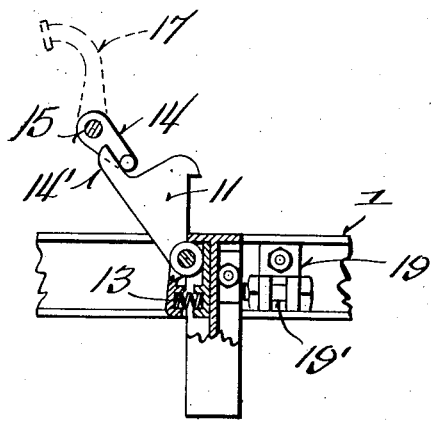
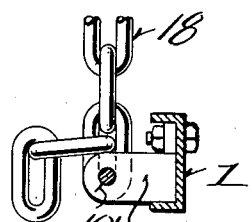
Inventor
R. T. Osman Patented Dec. 8, 1931

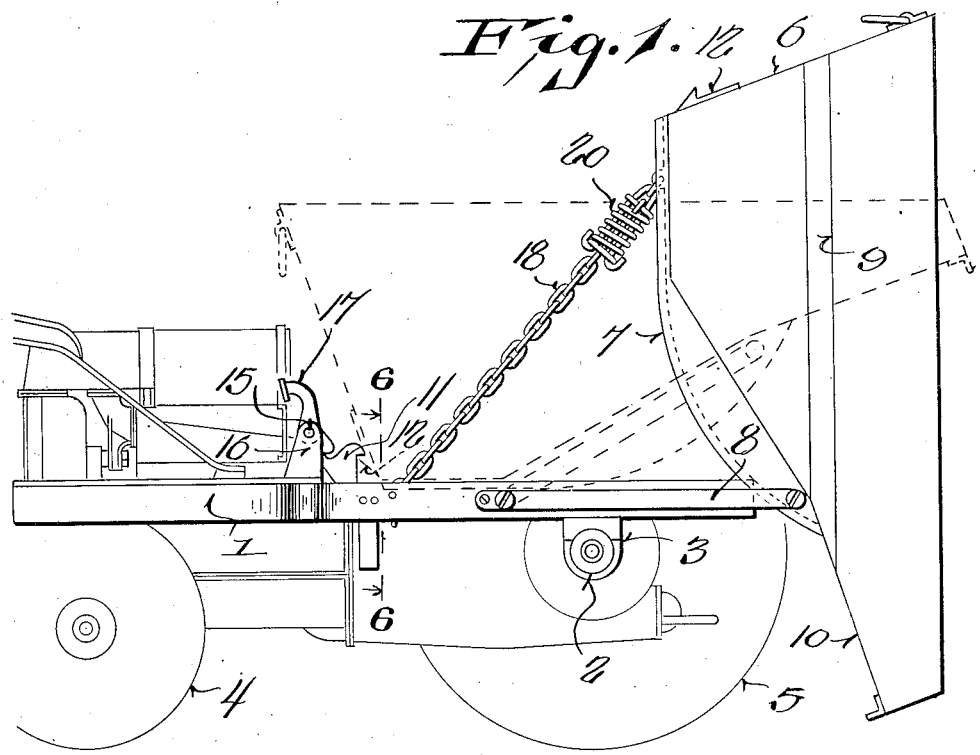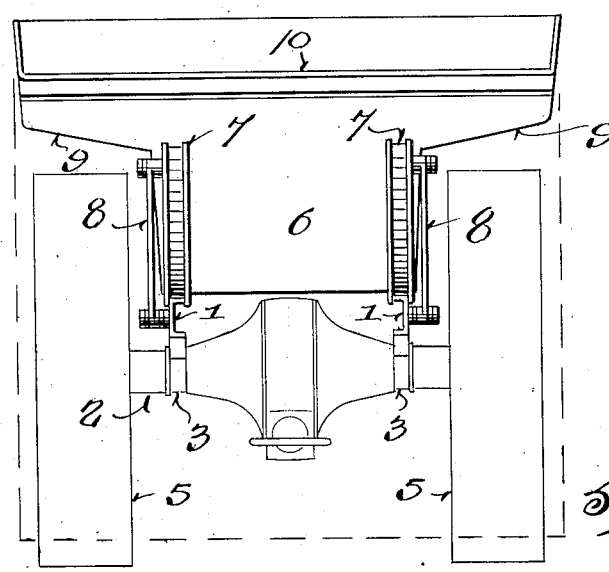

1,834,965

UNITED STATES PATENT OFFICE

RALPH T. OSMAN, OF MANSFIELD, OHIO

FRAME MOUNTING

Application filed June 6, 1928. Serial No. 283,395.

This invention pertains to improvements in dump bodies, and has primarily for its object to provide a dump body capable of "bulldozing" or spreading the material dumped from the body over the entire width of the truck or vehicle, thus causing the material to be spread under the wheels to support the same and prevent their sinking to too great a depth below the material, this being particularly desirable and necessary in filling over muddy or soft surfaces.

With the foregoing in view, a more specific object is to provide a pivotally mounted dump body having an overhanging nose adapted to swing downwardly to a point adjacent the ground, and of a width greater than that between the outsides of the supporting wheels.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

Figure 1 is an elevation of a conventional type of tractor equipped with the present invention.

Figure 2 is an end elevation.

Figure 3 is a detailed section through a portion of the body supporting track.

Figure 4 is a plan view with parts broken away to disclose structural features.

Figure 5 is a detailed section of the locking mechanism, taken on line 5—5 of Figure 4, and Figure 6 is a detailed section taken on the line 6—6 of Figure 1.

Referring now more particularly to the accompanying drawings, the invention is illustrated in connection with a conventional type of tractor, the same being shown in light lines. The tractor illustrated is of the "frame-less" type, and, therefore, in order to mount the dumping body thereon, a pair of side frames 1 are provided, which are secured adjacent one end to the axle housing 2 by means of yokes 3 surrounding the same, while the opposite ends of the frames are secured to the motor portion of the tractor in any suitable manner. The tractor is supported upon the usual steering wheels 4 and the traction wheels 5, the latter extending considerably beyond the side frames and being of a substantial width to give the desired traction.

Mounted on the side frames between the wheels 5 is a tiltable body 6, provided with channel track members 7 which straddle the side frames 1, the forward end of the tracks being arcuate to permit tilting of the body. To prevent shifting of the body on the side frames, links 8 are pivotally connected to the side frames through suitable brackets and to the track members 7 adjacent their forward ends.

In normal position the body is provided at its top with overhanging side portions 9 and an extended nose 10 adapted to swing downwardly to a point adjacent the ground when the body is released. Normally, when the body is tilted, it is so constructed that the overhanging nose end is slightly overbalanced, resulting in an automatic dumping action when the body is released. To normally lock the body against tilting, a pair of spaced dogs 11 are provided and engage the latch 12 carried by the body. Springs 13 engaging tails of the dogs normally urge them into locked position. For releasing the dogs a pair of trips 14 are mounted on the rocker shaft 15 which is journalled in bearings 16 carried by the side frame members. The trips 14 engage ears 14' carried by the dogs, and are actuated by rocking the shaft 15 through manipulation of a foot pedal 17.

To prevent overthrow of the body during the dumping operation, tie-chains 18 are utilized and are connected at their lower ends to the side frames 1 through the brackets 19 carried thereby. The opposite ends of the tie-chains are secured to the body through yieldable couplings 20, thus eliminating sudden jar with resulting strain upon the frame and body as the latter is dumped. The tilting action of the body may be regulated through adjustment of the tie-chains in the brackets 19, the links of the chain being held by suitable pins 19' passing through the brackets.

In operation it will be seen that after the body is released through actuation of the foot pedal 17, an over-balanced load will cause the same to rock on the side frame members, tilting the overhanging nose 10 downwardly to a point closely adjacent the ground, with the contents of the body dumped directly ahead of the same. The piled material is then bull-dozed or spread by forcing the nose 10 against the same, and because of the width of the nose, which is greater than the distance between the outsides of the supporting wheels, the material will be spread to such extent as to bring the same under the wheels as the nose of the body is forced over the material. Obviously this will prevent sinking of the wheels below the level of the spread material and will insure an even and level distribution of the material.

As clearly shown in the drawings, the rear lower edge of the dump body is provided with a depending angle bar, extending transversely across the dump body. This angle bar serves a dual function of reenforcing the bottom and acting as a scraper to evenly apply the dumped material.

It will also be appreciated that because of the overhanging structure of the top and bottom, the capacity is materially increased over a body confined to the width between the supporting wheels.

I claim:

1. In a dump vehicle, a frame including side bars, a dump body rockable on said side bars from and to a dumping position, and means for limiting the swinging movement of the dump body into dumping position including chains connected to the dump body, pairs of inwardly directed brackets on the frame having registering openings for receiving any selected links of the chains therebetween, and removable pins insertible through the registering openings of the brackets and through the selected links.

2. In a dump vehicle, a frame including side bars, a dump body rockable on said side bars from and to a dumping position, means for limiting the swing of the dump body into dumping position including chains connected to the dump body, pairs of inwardly directed brackets secured to the frame having registering openings for receiving any selected links of chains therebetween, pins insertible through the registering openings and through the selected links and resilient means incorporated between the chain and dump body.

In testimony that I claim the foregoing I have hereunto set my hand at Milwaukee, in the county of Milwaukee and State of Wisconsin.

RALPH T. OSMAN.